CORBIN & MORRIS.
Corn Harvester.
No. 20,628.
Patented June 22, 1858.
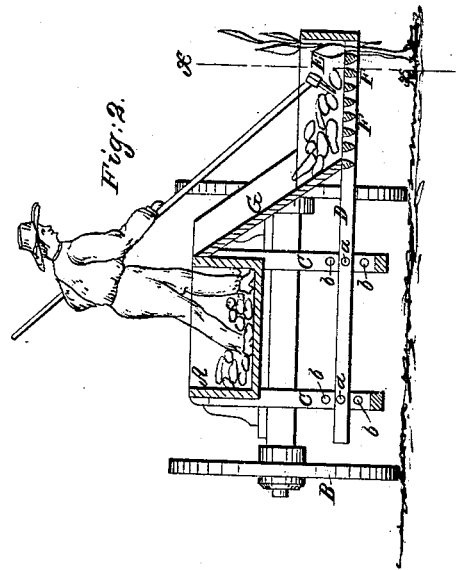
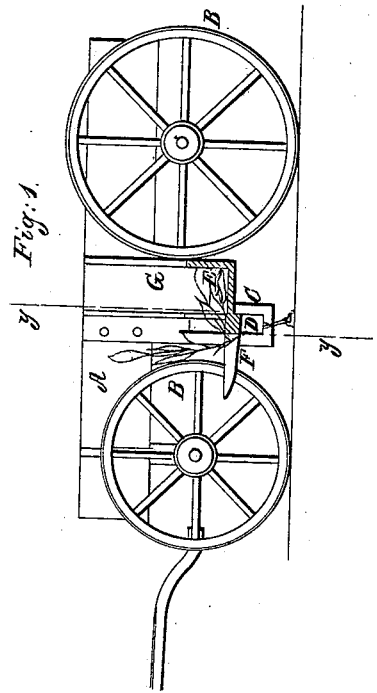

UNITED STATES PATENT OFFICE.

R. B. CORBIN AND JAS. MORRIS, OF ST. AUGUSTINE, ILLINOIS.

IMPROVEMENT IN CORN-HARVESTERS.

Specification forming part of Letters Patent No. 20,628, dated June 22, 1858.

*To all whom it may concern:*

Be it known that we, R. B. CORBIN and JAMES MORRIS, of St. Augustine, in the county of Fulton and State of Illinois, have invented a new and useful Machine for Harvesting Indian Corn; and we do hereby declare that the following is a full, clear, and exact description of the same, reference being had to the annexed drawings, making a part of this specification, in which—

Figure 1 is a side sectional elevation of a machine constructed according to our invention, x x, Fig. 2, indicating the plane of section. Fig. 2 is a transverse vertical section of the same, taken in the line y y, Fig. 1.

Similar letters of reference indicate corresponding parts in the two figures.

The object of this invention is to gather the ears of corn from the standing stalks, the latter being left in the field in their original position.

The invention consists in attaching to one side of an ordinary box-wagon a box having a rake at its front side, and an inclined trough connected with it and the wagon-body, the parts being so constructed that as the wagon is drawn along the rake will strip the ears from the standing stalks, the ears passing into the box, from which they are raked up the inclined trough into the wagon-body by an attendant.

To enable those skilled in the art to fully understand and construct our invention, we will proceed to describe it.

A represents the body, and B the wheels, of an ordinary wagon.

C C are two pendent bars, which are attached one to each side of the body A. The bars C are slotted longitudinally, and a horizontal bar, D, is fitted therein, and secured at any desired height by means of pins a, which pass through the bar D and through either of a series of holes, b, made transversely in the bars C.

On the outer end of the bar D a box or receptacle, E, is formed, and to the front edge of bar D, directly in front of the box, a series of teeth, F, are attached. These teeth may be about sixteen inches in length, constructed of metal or hard wood, and placed about one and three-fourths inch apart. The bar D also may be of hard wood, as also the pendent bars C C.

The box E may be of any proper or desired length, and an inclined trough or plane, G, is connected with the wagon-body A and box E.

The device or machine is used as follows: The wagon is drawn through the field so that the teeth F will strip the ears of corn from the standing stalks, the bar D being adjusted to the proper height so that the stalks will pass between the teeth F below the ears, and, as the teeth are forced or pushed along by the movement of the wagon, strip the ears from the stalks. The operation is clearly shown in red. (See more particularly Fig. 1.) The ears pass into the box E; and an attendant draws the ears up the inclined trough or plane G into the body A of the wagon by means of a rake, as shown in red, Fig. 2.

This machine is designed for the western country, where the stalks are not harvested or gathered, the ears being merely culled from the stalks—an operation which has hitherto been done by hand. By our invention three hundred bushels of ears may be gathered in a day, whereas the gathering of fifty bushels manually is a fair day's work.

Having thus described our invention, what we claim as new, and desire to secure by Letters Patent, is—

The rake-teeth F and box E, attached to the body A of the wagon, as shown, and made to communicate with said body A by means of the incline trough or plane G, the whole being arranged as and for the purpose set forth.

R. B. CORBIN.
JAMES MORRIS.

Witnesses:
WILLIAM KIRK,
LEWIS BASS.